(12) United States Patent
Tan et al.

(10) Patent No.: US 7,640,572 B2
(45) Date of Patent: Dec. 29, 2009

(54) ELECTRONIC SWITCH FOR TV SIGNAL BOOSTER

(75) Inventors: Sui Fen Tan, Kedah (MY); Wan Jyh Tan, Kuala Lumpur (MY); Youki Sai, Tokyo (JP); Hon Siong Ng, Pahang (MY)

(73) Assignee: Sony EMCS (Malaysia) Sdn. Bhd., Kula Lumpur (MY)

( * ) Notice: Subject to any disclaimer, the term of this patent is extended or adjusted under 35 U.S.C. 154(b) by 753 days.

(21) Appl. No.: 11/167,723

(22) Filed: Jun. 27, 2005

(65) Prior Publication Data

US 2005/0285979 A1    Dec. 29, 2005

(30) Foreign Application Priority Data

Jun. 28, 2004    (MY) .............................. PI 2004 2544

(51) Int. Cl.
*H04N 5/50*    (2006.01)
*H04N 5/14*    (2006.01)

(52) U.S. Cl. ................... 725/151; 348/732; 348/707; 725/139

(58) Field of Classification Search ............ 725/139, 725/151; 348/707, 725, 731–733; 330/127, 330/147–149
See application file for complete search history.

(56) References Cited

U.S. PATENT DOCUMENTS

| | | | | |
|---|---|---|---|---|
| 3,760,094 A * | 9/1973 | Skerlos | ........................ | 348/727 |
| 3,902,121 A * | 8/1975 | Yoshino et al. | .......... | 455/183.1 |
| 3,967,057 A * | 6/1976 | Tsukamoto et al. | ......... | 348/732 |
| 4,121,254 A * | 10/1978 | Morita et al. | ............ | 455/192.3 |
| 4,764,808 A * | 8/1988 | Solar | ............................ | 725/17 |
| 5,532,761 A * | 7/1996 | Lee | ............................... | 725/58 |
| 5,638,141 A * | 6/1997 | Bae et al. | ..................... | 348/735 |
| 6,400,421 B1 * | 6/2002 | Sakakibara | .................. | 348/732 |
| 6,405,372 B1 * | 6/2002 | Kim et al. | ..................... | 725/50 |
| 6,452,645 B1 * | 9/2002 | Kuhn et al. | .................. | 348/731 |
| 6,509,934 B1 * | 1/2003 | Bao et al. | .................... | 348/570 |
| 6,573,947 B1 * | 6/2003 | Oh | .............................. | 348/607 |
| 6,600,522 B1 * | 7/2003 | Kim | ............................ | 348/732 |
| 6,819,912 B2 * | 11/2004 | Roeckner et al. | ............ | 455/296 |
| 6,985,190 B1 * | 1/2006 | Klopfenstein et al. | ....... | 348/569 |
| 7,414,676 B2 * | 8/2008 | Lindstrom et al. | ........... | 348/731 |
| 2001/0030713 A1 * | 10/2001 | Meersseman | ................ | 348/731 |
| 2002/0093598 A1 * | 7/2002 | Yamamoto | ................... | 348/734 |
| 2003/0115589 A1 * | 6/2003 | D'Souza et al. | ................ | 725/10 |
| 2003/0159156 A1 * | 8/2003 | Fulga et al. | .................. | 725/151 |
| 2004/0029537 A1 * | 2/2004 | Pugel et al. | ................ | 455/115.1 |
| 2004/0036772 A1 * | 2/2004 | Pugel et al. | .................. | 348/180 |
| 2005/0005296 A1 * | 1/2005 | Bargroff et al. | ................ | 725/63 |
| 2005/0024544 A1 * | 2/2005 | Waight et al. | ................ | 348/731 |

* cited by examiner

*Primary Examiner*—Brian T Pendleton
*Assistant Examiner*—Jonathan Lewis
(74) *Attorney, Agent, or Firm*—Frommer Lawrence & Haug LLP; William S. Frommer; Thomas F. Presson

(57) ABSTRACT

A method of automatically disabling a low noise amplifier (LNA) that serves to boost weak video signals in a TV tuner, when the television receives a cable TV service. The method involves storing the total number of preset programs assigned during an initial auto-tune setup operation. If the total count exceeds a predetermined threshold, this indicates cable TV service whose signals will not require boosting. The LNA is then disabled to avoid interference between programs on neighboring channels.

7 Claims, 1 Drawing Sheet

ELECTRONIC SWITCH FOR TV SIGNAL BOOSTER

TECHNICAL FIELD

The present invention generally relates to TV tuners, and more particularly, to controlling a signal booster in a TV tuner.

BACKGROUND ART

Television broadcasts are transmitted using high frequency RF carriers. These high frequency carriers are easily deflected, reflected and blocked by obstructions such as concrete walls of buildings, trees and mountains. As such, the strength of television broadcast signals varies greatly from one area to another. The quality of the reception of a given television station depends on many factors, including the location of the television receiver, the position of the television receiver, the quality and type (indoor or outdoor) of the receiving antenna used and the quality of the antenna cable used. The shielding effect of the antenna cable used will also have a substantial effect on the quality of a received television signal.

Generally, in an area where the signal of a particular television station is considerably weak, the use of a television signal booster (RF amplifier) to increase the signal strength for that particular television station is very favourable. However, as signal strengths from other television stations are often already more than sufficient, it may be necessary to turn the television signal booster off when the television receiver is receiving program from a television station with a strong signal. Otherwise, the received RF signal will be over-amplified, causing the signal to saturate in the receiver's amplifier, adding more noise to the original signal.

If a television station broadcasts at a frequency sandwiched between two stronger television stations, turning on the booster while receiving signal from that station may result in signals from the adjacent television stations being amplified, causing interference and adding noise to the original signal.

A cable television service is normally characterized by having a much larger number of stations than available through an off-the-air terrestrial service, and accordingly by an overall narrower separation of neighboring channels. Generally, the RF signals of a cable television service will be of a desirable signal strength and will not require boosting. Indeed, switching on a booster amplifier when connected to a cable television service most often causes interference by adjacent channels being amplified together and causing a noticeable beat effect on the TV picture. This effect is manifest as, for example, wide diagonal or wavy beat lines spoiling the picture.

Conventional television receivers incorporating an internal television signal booster require the user to either switch on or off the booster manually, depending on the condition of a received television signal. In fact, the user will most likely keep the booster amplifier permanently switched on. Moreover, the lay user cannot be expected to understand that the booster can worsen his TV picture if it is switched on when not required, such as when a cable TV service is received.

Japanese patent application publication 2001-244836 discloses reducing interference due to beat noise components, by lowering the gain of the high frequency amplification during channel search. This is achieved by lowering the AGC signal feedback to the RF amplifier during automatic channel search.

Japanese utility model H05-20472 teaches disabling the operation of the RF amplifier during channel preset, to avoid cross modulation and hum modulation.

Japanese patent application publication H05-304640 discloses bypassing an RF amplifier when the AGC voltage satisfies a predetermined voltage.

Japanese utility model S58-138465 discloses turning an RF signal booster on or off depending on the strength of the input signal.

SUMMARY OF INVENTION

The principal aim of the present invention is to provide a method and apparatus that save a TV viewer the inconvenience and complication associated with having to manually switch off a signal booster function in the TV, when signal boosting is simply not required and prone to spoil the TV picture. Such a situation arises especially when a cable TV service is received.

According to one aspect of the present invention, there is provided a method of automatically enabling/disabling a low noise amplifier (LNA) that serves to boost weak video signals in a TV tuner, the method comprising:
(a) storing a count corresponding to a total number of preset channels assigned in an auto-tune operation;
(b) comparing said count with a predetermined threshold;
(c) disabling said LNA if said count exceeds said threshold, and otherwise enabling said LNA.

The above method is performed in the course of an initial setup operation of the TV, after an auto-tune has established the number of preset channels (stations). The total count of such channels is used in this invention in a simple and convenient way of determining the nature of the TV service. As mentioned already, the number of channels receivable off the air will ordinarily be significantly lower than the number of channels receivable via cable service. Thus, by setting the threshold channel count appropriately, it can be readily determined automatically if a cable service is in use. If so, the booster amplifier is disabled to avoid picture beat interference. On the other hand, if the channel count is below the threshold, it is assumed that off-the-air signals are being received. In this case, the booster amplifier is enabled, and allowed to be switched on and off automatically by the system based for example on determination of the signal and/or noise level of the particular program being received.

The channel threshold is factory set according to the requirements of the end market, and can be changed subsequently by a service engineer, if necessary, through the TV's initial setup interface.

According to another aspect of the present invention, there is provided an electronic control for automatically enabling / disabling a low noise amplifier (LNA) that serves to boost weak signals in a TV tuner, comprising:
storage means for storing a count corresponding to a total number of preset channels assigned in an auto-tune operation;
processing means for comparing said count with a predetermined threshold; and
output means for outputting a control signal to enable or disable said LNA;
wherein the processing means generates said control signal at said output means to disable said LNA when said count exceeds said predetermined threshold, and otherwise generates said control signal at said output means to enable said LNA.

In an example of a preferred embodiment of the present invention, the processing means may be included in a microcontroller.

In another example of a preferred embodiment, the storage means comprises memory within the microcontroller.

In a further aspect, the present invention provides a TV comprising a TV tuner and having a low noise amplifier (LNA) that serves to boost weak signals in said TV tuner, characterized by means for determining whether a total number of preset channels assigned in an auto-tune operation exceeds a predetermined threshold and, if so, disabling said LNA.

An advantage of the present invention is that the necessary data processing can be done in an existing integrated circuit such as a so-called Ultimate-One-Chip (UOC) by simple programming of its ROM memory. The Ultimate-One-Chip belongs to a family of signal processors available from Philips Semiconductors of Eindhoven, The Netherlands, for example. The processors are for example multi-system (PAL/NTSC/SECAM) TV processor chips developed by Philips, that incorporate a programmable microcontroller, text and sound decoding support and on screen display functions. A single UOC is able to perform functions of many separate components in an analogue television and the functions of these integrated components are controlled by the microcontroller. Thus, the electronic switch of the invention can be implemented, for example, in such a chip on the television's main printed circuit board (PCB) without any increase in component count.

BRIEF DESCRIPTION OF THE DRAWINGS

The invention is illustrated, but not limited, by the following description of preferred embodiments, that is given by way of example only with reference to the accompanying drawings, in which.

DESCRIPTION OF THE PREFERRED EMBODIMENTS

Figure 1:
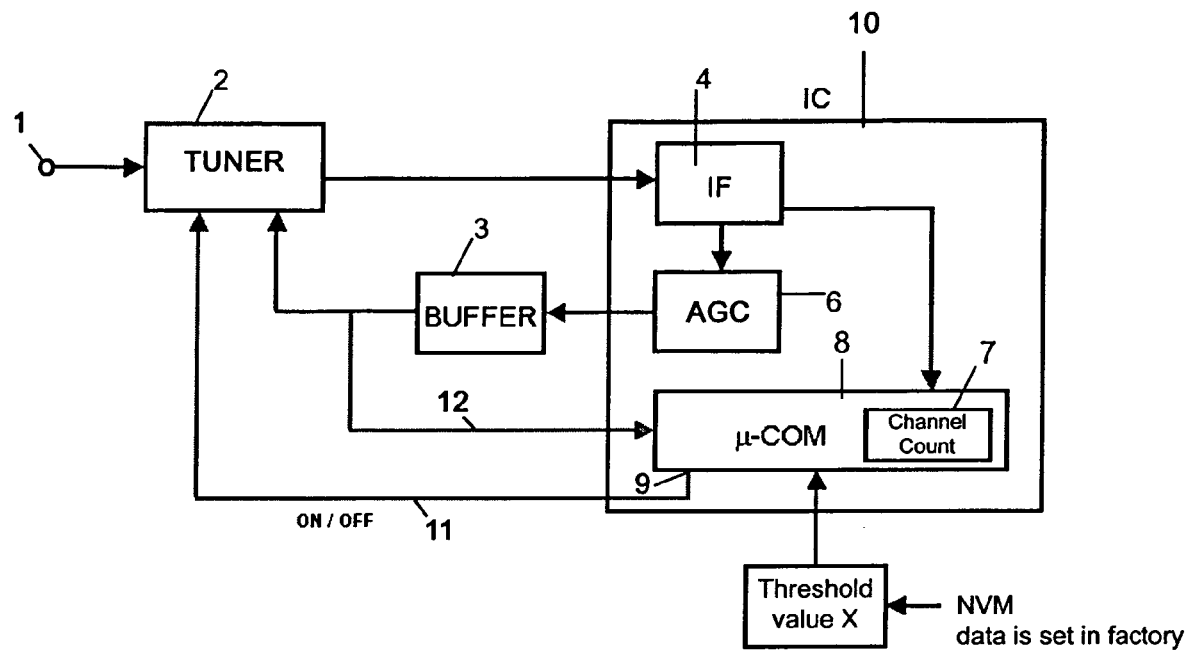
FIG. 1 is a block diagram of a television tuner circuit incorporating an amplified tuner and an Ultimate One Chip (UOC).

An example of a preferred embodiment of the present invention will be described with reference to the attached drawings, in which FIG. 1 describes a signal reception circuit including a tuner 2, a processing section 10 and a buffer 3. The processing section 10 has an IF converter 4, an AGC (Automatic Gain Controller) 6 and a microcontroller 8. Typically, the processing section 10 may be realized by utilizing an Ultimate One Chip (UOC) 10. The UOC is suitably a Philips TDA 12067 family TV processor chip. In this example of a preferred embodiment, the tuner 2 incorporates an integral LNA (booster amplifier) (not shown), that can be selectively switched on or off according to a control signal on line 11.

When the television is switched on, television signals from off the air or a cable TV service are received through RF input 1. The signals are downconverted to an IF frequency such as 38 MHz by the tuner 2 and enter the UOC 10.

The electronic switch of the present invention is operated automatically during initial setup of the television. Upon completion of an auto-tune program in which preset channels are defined after a sweep through the entire reception frequency range, a program implementing the present invention is called up. The microcontroller 8 in the UOC 10 initiates the signal booster selection program to on (steps 20 and 21 in FIG. 2) and determines the total count of preset channels assigned in the auto-tune operation. Such a count can be done by checking the memory location of the data for the final station received in the auto-tune process. This count is stored in channel counter 7, which in practice, may be a free memory location within microcontroller 8 assigned to store this value. However, the channel counter 7 may also be provided outside the microcontroller 8 as a separate counter.

The stored count value is provided as an input to microcontroller 8, which then determines in step 22 (FIG. 2) whether the stored count exceeds a predetermined threshold, X (FIG. 1). A suitable threshold value is, for example, 25. However, the actual value used needs to be optimized based on TV service conditions in the country and area of application. This threshold value is provided as an input to the microcontroller 8 as shown in FIG. 1. Such input can be preset in the factory, for example. It can be also set according to the conditions of the region in which the television set is utilized, like prior to selling, in a store or delivery center.

If the stored channel count exceeds or equals the threshold, the LNA in tuner 2 is disabled (step 23) through a control signal on line 11 from output 9 of microcontroller 8. This condition determines, for example, that a cable TV service is being received, so that signal boosting will not be required. Accordingly, the viewer will experience good picture quality without any undesirable beat effects due to interference from neighbouring channels.

On the other hand, if the stored channel count is below the threshold, it is determined that, for example, off-the-air TV service is being received. In this case, the LNA in tuner 2 is enabled (step 24) through the control signal on line 11. Preferably, enabling the LNA means that its on/off operation is determined automatically for each individual channel, based on the signal conditions. For example, an AGC signal from block 6 in UOC 10 may be fed back through buffer 3 to microcontroller 8 on line 12, as a basis for deciding whether the booster should be switched on or off for the particular channel being received.

After the determination made in step 23 or step 24, the program terminates (step 25).

Figure 2:
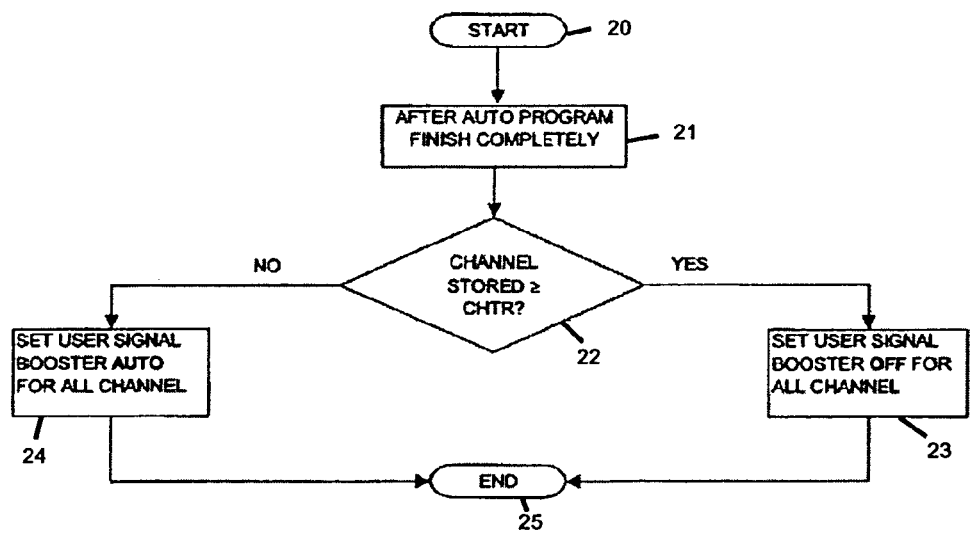
FIG. 2 is a flowchart illustrating the steps of a program used to determine whether the signal booster should be turned on or off.

Implementation of the necessary programming of microcontroller 8 as per the flowchart of FIG. 2, is within the competence of a person of ordinary skill in the art and so does not require further elaboration.

It is understood that the present invention may be embodied in numerous other ways without departing from the scope of the invention.

The arrangements of the illustrated diagrams may be modified and such blocks as illustrated should not be construed so as to limit the technical scope of the claims of the present invention.

The invention claimed is:

1. A method of automatically enabling or disabling a low noise amplifier (LNA) that serves to boost a video signal in a TV tuner, the method executed by a processor comprising:
   storing a total number of preset channels assigned in an auto-tune operation in a memory;
   comparing said total number of the preset channels with a threshold utilizing a microcontroller;
   disabling said LNA if said total number of preset channels exceeds or equals said threshold utilizing the microcontroller, and
   enabling said LNA if said total number of preset channels is less than said threshold utilizing the microcontroller.

2. The method according to claim 1 further comprising storing said threshold value.

3. An electronic control for automatically enabling or disabling a low noise amplifier (LNA) that serves to boost weak signals in a TV tuner, comprising:

storage means for storing a total number of preset channels assigned in an auto-tune operation;

processing means for comparing said total number of preset channels with a threshold; and output means for outputting a control signal to enable or disable said LNA;

wherein the processing means generates said control signal at said output means to disable said LNA when said total number of preset channels exceeds or equals said threshold, and generates said control signal at said output means to enable said LNA when said total number of preset channels is less than said threshold.

4. The electronic control according to claim 3, wherein said threshold is stored in a storage means accessible to said processing means.

5. The electronic control according to claim 3, wherein said processing means comprises a microcontroller.

6. The electronic control according to claim 3, wherein said storage means comprises memory within said microcontroller.

7. A television device comprising:

a TV tuner;

a low noise amplifier (LNA) that serves to boost weak signals in said TV tuner, including an electronic control means for automatically enabling or disabling the low noise amplifier (LNA), comprising:

storage means for storing a total number of preset channels assigned in an auto-tune operation;

processing means for comparing said total number of preset channels with a threshold; and output means for outputting a control signal to enable or disable said LNA;

wherein the processing means generates said control signal at said output means to disable said LNA when said total number of preset channels exceeds or equals said threshold, and generates said control signal at said output means to enable said LNA when said total number of preset channels is less than said threshold.

\* \* \* \* \*

UNITED STATES PATENT AND TRADEMARK OFFICE
CERTIFICATE OF CORRECTION

| | | |
|---|---|---|
| PATENT NO. | : 7,640,572 B2 | Page 1 of 1 |
| APPLICATION NO. | : 11/167723 | |
| DATED | : December 29, 2009 | |
| INVENTOR(S) | : Tan et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 989 days.

Signed and Sealed this

Sixteenth Day of November, 2010

David J. Kappos
*Director of the United States Patent and Trademark Office*